United States Patent
Bialer et al.

(10) Patent No.: US 11,964,654 B2
(45) Date of Patent: Apr. 23, 2024

(54) SPATIALLY INVARIANT 3D CONVOLUTIONAL NETWORK OVER SPHERICAL COORDINATE INPUT

(71) Applicant: GM Global Technology Operations LLC, Detroit, MI (US)

(72) Inventors: Oded Bialer, Petah Tivak (IL); Amnon Jonas, Herzliya (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 795 days.

(21) Appl. No.: 17/085,290

(22) Filed: Oct. 30, 2020

(65) Prior Publication Data
US 2022/0135028 A1 May 5, 2022

(51) Int. Cl.
| | |
|---|---|
| *B60W 30/095* | (2012.01) |
| *B60W 30/09* | (2012.01) |
| *B60W 60/00* | (2020.01) |
| *G06V 10/44* | (2022.01) |
| *G06V 20/56* | (2022.01) |

(52) U.S. Cl.
CPC ........ *B60W 30/0956* (2013.01); *B60W 30/09* (2013.01); *B60W 60/001* (2020.02); *G06V 10/443* (2022.01); *G06V 20/56* (2022.01); *B60W 2420/42* (2013.01); *B60W 2420/52* (2013.01)

(58) Field of Classification Search
CPC ............. B60W 30/0956; B60W 30/09; B60W 60/001; B60W 2420/42; B60W 2420/52; G06V 10/443; G06V 20/56; G06V 10/82; G06V 20/58; G06F 17/153
See application file for complete search history.

(56) References Cited

U.S. PATENT DOCUMENTS

| | | | | |
|---|---|---|---|---|
| 2020/0134833 A1* | 4/2020 | Biswas | .................. | G06N 5/046 |
| 2020/0151492 A1* | 5/2020 | Chen | ..................... | G06F 18/241 |
| 2022/0135028 A1* | 5/2022 | Bialer | .................... | G06V 10/82 |
| | | | | 701/26 |
| 2023/0324234 A1* | 10/2023 | Wang | ..................... | G01K 11/32 |
| | | | | 374/161 |
| 2023/0368334 A1* | 11/2023 | Kapelner | ............... | G06V 10/82 |
| 2023/0403312 A1* | 12/2023 | Oyman | ............... | H04L 65/1073 |

OTHER PUBLICATIONS

Lee, H.Y., Ho, H.W. & Zhou, Y. Deep Learning-based Monocular Obstacle Avoidance for Unmanned Aerial Vehicle Navigation in Tree Plantations. J Intell Robot Syst 101, 5 (2021). https://doi.org/10.1007/s10846-020-01284-z (Year: 2021).*

* cited by examiner

*Primary Examiner* — Thomas Ingram
(74) *Attorney, Agent, or Firm* — CANTOR COLBURN LLP (57) ABSTRACT

A vehicle, and a system and method for operating the vehicle. The system includes a sensor and a processor. The sensor obtains a detection set related to an object at a range from the vehicle. The processor is configured to select a convolution path for the detection set based on a range of the object, wherein the convolution path includes one or more convolutional layers and a number of the one or more convolutional layers is dependent on the range of the object, apply the one or more convolutional layers of the selected convolution path to the detection set to generate a filtered data set, and operate the vehicle with respect to the object using the filtered data set.

20 Claims, 5 Drawing Sheets

SPATIALLY INVARIANT 3D CONVOLUTIONAL NETWORK OVER SPHERICAL COORDINATE INPUT

INTRODUCTION

The subject disclosure relates to a system and method for determining a feature of an object with respect to a vehicle and, in particular, to a system and method for adjusting a convolution filter based on a distance of the object to the vehicle.

An autonomous vehicle detects an object in its environment and navigates along a selected trajectory with respect to the object. One or more sensors associated with the autonomous vehicle can be used to detect the object. Three-dimensional sensors, such as Lidar and radar essentially provide point cloud detections, which can be provided to convolutional networks in order to extract features of the object. Since, point cloud detections are received in a spherical coordinate system, the number of detections received from the object can vary significantly with distance. Applying standard convolutional networks to such detections is problematic, since the convolutional network relies on spatially invariant features. Additionally, transforming the detections into Cartesian coordinates can produce a point density that varies with range. Accordingly, it is desirable to provide a convolutional network that provides output that is spatially invariant with range.

SUMMARY

In one exemplary embodiment, a method of operating a vehicle is disclosed. A detection set related to an object at a range from the vehicle is obtained. A convolution path for the detection set is selected based on a range of the object, wherein the convolution path includes one or more convolutional layers and a number of the one or more convolutional layers is dependent on the range of the object. The one or more convolutional layers of the selected convolution path are applied to the detection set to generate a filtered data set. The vehicle is operated with respect to the object using the filtered data set.

In addition to one or more of the features described herein, the one or more convolutional layers includes a first convolutional layer and a sampling rate of the first convolutional layer that increases as the range decreases. In an embodiment in which the one or more convolutional layers includes a first convolutional layer, the method further includes defining a first subrange with respect to the vehicle and a second subrange with respect to the vehicle that is less than the first subrange, applying the first convolutional layer at a first sampling rate when the object is in the first subrange and applying the first convolutional layer at a second sampling rate when the object is in the second subrange, wherein the second sampling rate is twice the first sampling rate. The method further includes applying a second convolutional layer at the first sampling rate to an intermediate set generated at the first convolutional layer when the object is in the second subrange. The method further includes defining a third subrange with respect to the vehicle that is less than the second subrange, applying the first convolutional layer at a third sampling rate when the object is in the third subrange, wherein the third sampling rate is twice the second sampling rate, applying a second convolutional layer at the second sampling rate to an intermediate set generated at the first convolutional layer, and applying a third convolutional layer to an output of the second convolutional layer at the first sampling rate. In another embodiment in which the one or more convolutional layers includes a first convolutional layer, the method further includes defining a first subrange with respect to the vehicle and a second subrange with respect to the vehicle that is less than the first subrange, and one of applying the first convolutional layer to the detection set once in the first subrange and applying the first convolutional layer twice in the second subrange, wherein a sampling rate of the first convolutional layer is the same within the first subrange and the second subrange. The method further includes defining a first subrange and a second subrange, defining a first weight over the first subrange and a second weight over the second subrange for selecting the convolution path, wherein the first weight and the second weight taper linearly with radial distance at a radial boundary between the first subrange and the second subrange with a sum of the first weight and the second weight equal to one.

In another exemplary embodiment, a system for operating a vehicle is disclosed. The system includes a sensor and a processor. The sensor obtains a detection set related to an object at a range from the vehicle. The processor is configured to select a convolution path for the detection set based on a range of the object, wherein the convolution path includes one or more convolutional layers and a number of the one or more convolutional layers is dependent on the range of the object, apply the one or more convolutional layers of the selected convolution path to the detection set to generate a filtered data set, and operate the vehicle with respect to the object using the filtered data set.

In addition to one or more of the features described herein, the one or more convolutional layers includes a first convolutional layer and a sampling rate of the first convolutional layer that increases as the range decreases. In an embodiment in which the one or more convolutional layers includes a first convolutional layer, the processor is further configured to define a first subrange with respect to the vehicle and a second subrange with respect to the vehicle that is less than the first subrange, apply the first convolutional layer at a first sampling rate when the object is in the first subrange and apply the first convolutional layer at a second sampling rate when the object is in the second subrange, wherein the second sampling rate is twice the first sampling rate. The processor is further configured to apply a second convolutional layer at the first sampling rate to an intermediate set generated at the first convolutional layer when the object is in the second subrange. The processor is further configured to define a third subrange with respect to the vehicle that is less than the second subrange, apply the first convolutional layer at a third sampling rate when the object is in the third subrange, wherein the third sampling rate is twice the second sampling rate, apply a second convolutional layer at the second sampling rate to an intermediate set generated at the first convolutional layer, and apply a third convolutional layer to an output of the second convolutional layer at the first sampling rate. In another embodiment in which the one or more convolutional layers includes a first convolutional layer, the processor is further configured to define a first subrange with respect to the vehicle and a second subrange with respect to the vehicle that is less than the first subrange, and perform one of applying the first convolutional layer to the detection set once in the first subrange and applying the first convolutional layer twice in the second subrange, wherein a sampling rate of the first convolutional layer is the same within the first subrange and the second subrange. The processor is further configured to define a first subrange and a second subrange and define a first weight over the first subrange and a second weight over the second subrange for selecting the convolution path, wherein the first weight and the second weight taper linearly with radial distance at a radial boundary between the first subrange and the second subrange with a sum of the first weight and the second weight equal to one.

In yet another exemplary embodiment, a vehicle is disclosed. The vehicle includes a sensor and a processor. The sensor obtains a detection set related to an object at a range from the vehicle. The processor is configured to select a convolution path for the detection set based on a range of the object, wherein the convolution path includes one or more convolutional layers and a number of the one or more convolutional layers is dependent on the range of the object, apply the one or more convolutional layers of the selected convolution path to the detection set to generate a filtered data set, and operate the vehicle with respect to the object using the filtered data set.

In addition to one or more of the features described herein, the one or more convolutional layers includes a first convolutional layer and a sampling rate of the first convolutional layer that increases as the range decreases. In an embodiment in which the one or more convolutional layers includes a first convolutional layer, the processor is further configured to define a first subrange with respect to the vehicle and a second subrange with respect to the vehicle that is less than the first subrange, apply the first convolutional layer at a first sampling rate when the object is in the first subrange and apply the first convolutional layer at a second sampling rate when the object is in the second subrange, wherein the second sampling rate is twice the first sampling rate. The processor is further configured to apply a second convolutional layer at the first sampling rate to an intermediate set generated at the first convolutional layer when the object is in the second subrange. In another embodiment in which the one or more convolutional layers includes a first convolutional layer, the processor is further configured to define a first subrange with respect to the vehicle and a second subrange with respect to the vehicle that is less than the first subrange, and perform one of applying the first convolutional layer to the detection set once in the first subrange and applying the first convolutional layer twice in the second subrange, wherein a sampling rate of the first convolutional layer is the same within the first subrange and the second subrange. The processor is further configured to define a first subrange and a second subrange and define a first weight over the first subrange and a second weight over the second subrange for selecting the convolution path, wherein the first weight and the second weight taper linearly with radial distance at a radial boundary between the first subrange and the second subrange with a sum of the first weight and the second weight equal to one.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
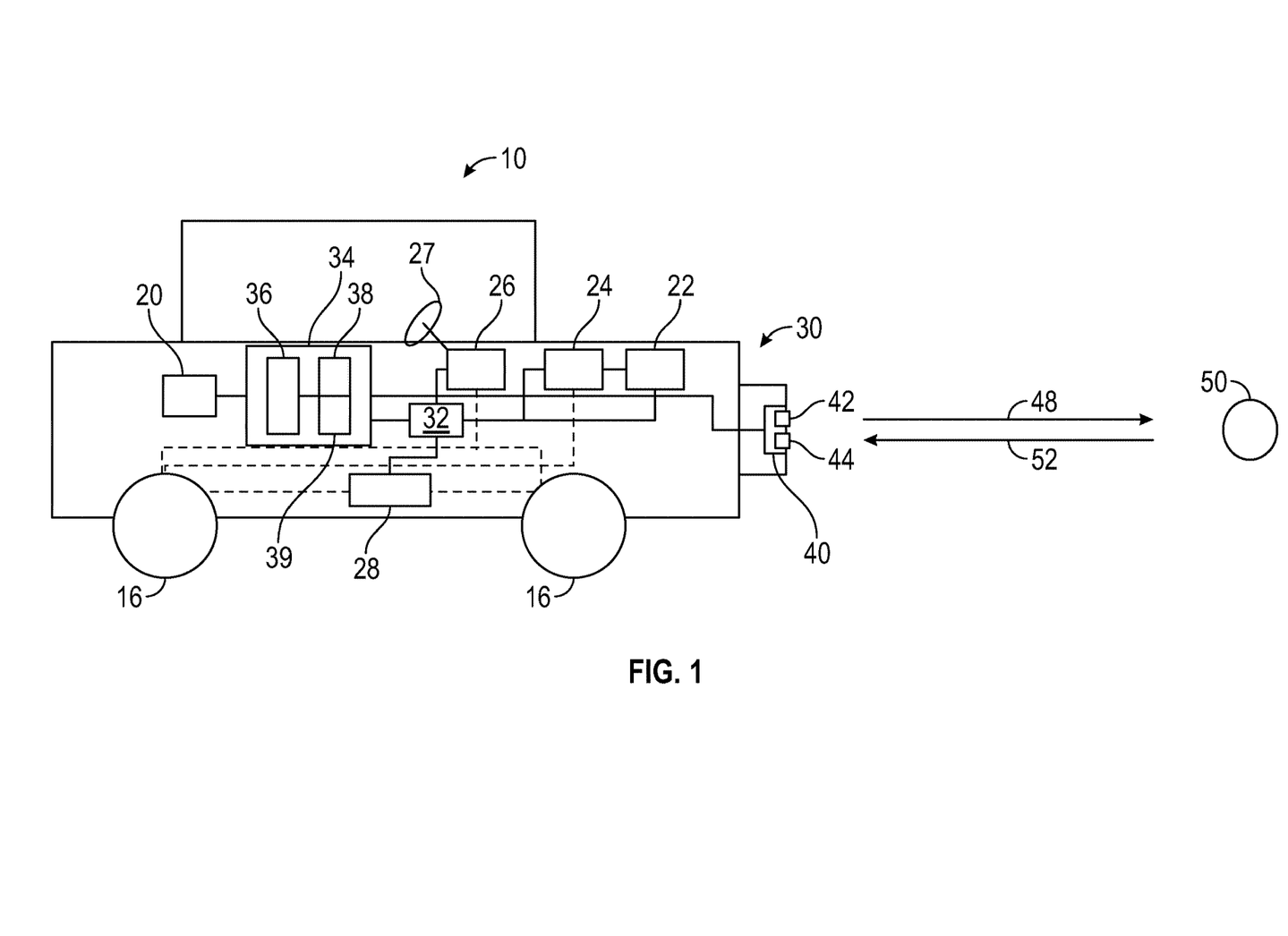
FIG. 1 shows an autonomous vehicle in an exemplary embodiment.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of the Levels One through Five.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a trajectory plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a three-dimensional sensor 40 that senses objects in an exterior environment of the autonomous vehicle 10 and provides various parameters of the objects useful in locating the position and relative velocities of various remote vehicles in the environment of the autonomous vehicle. Such parameters can be provided to the navigation system 20. The three-dimensional sensor can be radar or Lidar or any other sensor operating using polar or spherical coordinates. In operation, the transmitter 42 of the three-dimensional sensor 40 sends out a source signal 48 that is reflected back at the autonomous vehicle 10 by an object 50 in the field of view of the three-dimensional sensor 40 as one or more echo signals 52, also referred to herein as detections, which are received at receiver 44. The one or more echo signals 52 can be used to determine various parameters of the one or more objects 50, such as a range of the object, Doppler frequency or relative radial velocity of the object, and azimuth, etc. The sensor system 30 can also include additional sensors, such as digital cameras, for identifying road features, etc.

The navigation system 20 builds a trajectory for the autonomous vehicle 10 based on parameters from the three-dimensional sensor 40 and any other relevant parameters. The controller 34 can provide the trajectory to the actuator system 32 to control the propulsion system 22, transmission system 24, steering system 26, and/or brake system 28 in order to navigate the autonomous vehicle 10 with respect to the object 50.

The controller 34 includes a processor 36 and a computer readable storage device or storage medium 38. The computer readable storage medium includes programs or instructions 39 that, when executed by the processor 36, operate the autonomous vehicle based at least on parameters from the three-dimensional sensor and other relevant data. The storage medium 38 may further include programs or instructions 39 that when executed by the processor 36, determines a state of an object 50 in order to allow the autonomous vehicle to navigate with respect to the object.

Figure 2:
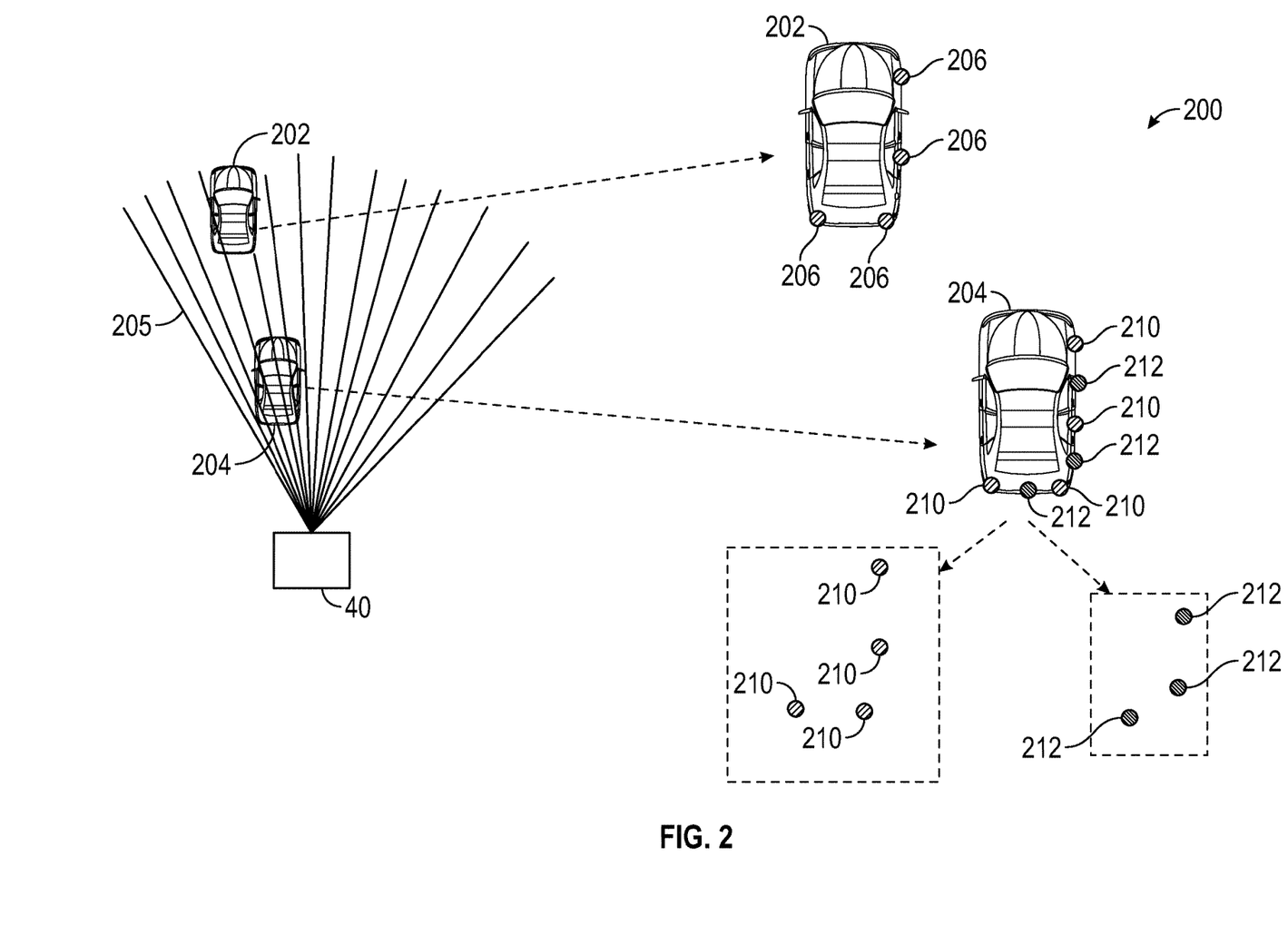
FIG. 2 shows a diagram illustrating the effects of vehicle-object distance on resolution of an object.

FIG. 2 shows a diagram 200 illustrating the effects of vehicle-object distance on resolution of an object. Source signals 205 diverge from the three-dimensional sensor 40. As is well-known, the intensity of the source signals 205 obeys an inverse square law. A first agent 202 and a second agent 204 are shown within the range of the three-dimensional sensor 40. The first agent 202 is located at a distance further away from the three-dimensional sensor 40 than the second agent 204. Due to the nature of the source signals 205, a returning set of detections is received along an azimuth of the field of view of the three-dimensional sensor 40. These detections are recorded in azimuthal bins at the three-dimensional sensor 40.

An enlarged version of the first agent 202 shows detections 206 from the first agent 202. An enlarged version of the second agent 204 shows detections 210 and 212 from the second agent 204. Due to the relative proximity of the second agent 204 to the three-dimensional sensor 40, the number of detections from the second agent 204 is greater than the number of detections from the first agent 202. The detections from the second agent 204 are separated in an alternating manner into an "even" group including detections 210 and an "odd" group including detections 212. The detections 210 from the "even" group have the same shape as the detections 206 from the first agent 202. By selecting every other detection, a group (e.g., the "odd" group) can be comparable to the detections 206.

The method disclosed herein receives detections from the environment surrounding a vehicle into azimuthal bins and applies a series of convolutional layers to the azimuthal bins to extract a feature of the object. These convolutional layers are applied sequentially, with output from one convolutional layer being provided as input to the next convolutional layer in the sequence. Each convolutional layer applies a filter for the layer to its input. The number of convolutional layers applied to the azimuthal bins varies with a range of the object, with the number of convolutional layers increasing as the range decreases. In various embodiments, the range can be segmented into a plurality of subranges. Once it is determined in which the subrange the object is disposed, a selected convolution path including an appropriate number of convolution filter can be applied to the detection set. In one embodiment, a sampling rate of a convolutional layer can be increased as range decreases. In another embodiment, a number of times a convolutional layer is applied to the detection set can be increased as range decreases.

Figure 3:
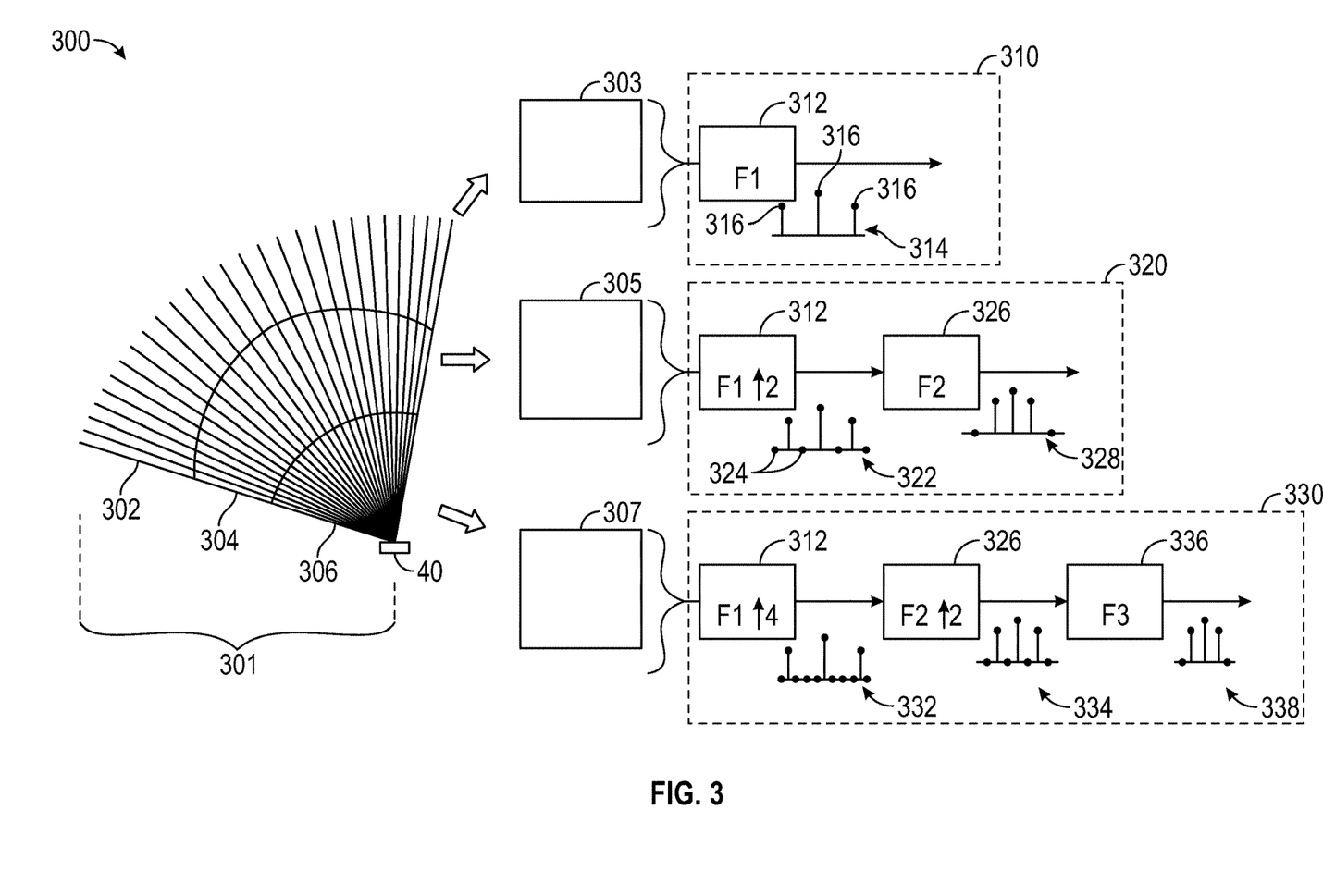
FIG. 3 show a block diagram illustrating a method of extracting a feature from an object using a range-dependent set of convolutional layers.

FIG. 3 show a block diagram 300 illustrating a method of extracting a feature from an object using a range-dependent set of convolutional layers. The method includes applying one or more convolution filters to a set of detection points received from the object. The number of convolutional layers is dependent on range of the object and increases with decreasing range. For a selected convolutional layer, a sampling rate increases as the range decreases.

The range of the three-dimensional sensor 40 can be divided into a plurality of subranges. In FIG. 3, the range 301 of the three-dimensional sensor 40 is divided into a first subrange 302, a second subrange 304 and a third subrange 306. The radial boundaries of these subranges are identified by radial distances R1, R2 and Rmax, wherein R1<R2<Rmax. The first subrange 302 is defined by radial distances between R2 and Rmax (i.e., R2<r<=Rmax). The second subrange 304 is defined by radial distances between R1 and R2 (i.e., R1<r<=R2). The third subrange 306 is defined by radial distance between 0 and R1 (i.e., 0<r<=R1).

Due to the inverse square law, the resolution of the detections decreases with distance from the three-dimensional sensor 40. Detections received from the first subrange 302 form a low-resolution detection set 303. Detections received from the second subrange 304 form a medium resolution detection set 305. Detections received from the third subrange 306 form a high-resolution detection set 307. Assuming detections based on the same source signals, the density of high-resolution detection set 307 is greater than the density of the medium resolution detection set 305, which is greater than the density of the low-resolution detection set 303.

The low-resolution detection set 303 is processed along a first convolution path 310 including a first convolutional layer 312. The first convolutional layer 312 includes a first filter 314 which is applied to the low-resolution detection set 303 at a first sampling rate. For illustrative purpose, the first filter 314 is shown having three azimuthally dependent coefficients 316, with each coefficient being applied to its appropriate azimuth bin during convolution. Applying the first convolutional layer 312 to the low-resolution detection set 303 generates a filtered data set from which a feature can be extracted.

The medium resolution detection set 305 is processed along a second convolution path 320. The second convolution path 320 includes the first convolutional layer 312 (operated at a second sampling rate that is twice the first sampling rate) and a second convolutional layer 326 operated at the first sampling rate. The first convolutional layer 312 samples the medium resolution detection set 305 (at the second sampling rate) using second filter 322. The second filter 322 is modified from first filter 314 by the addition of zero coefficient values 324 at every other azimuth bin. Applying second filter 322 selects every other azimuth bin from the medium resolution detection set 305 and generates a first convolved set. The first convolved set is then processed by the second convolutional layer 326 operating at the first sampling rate. The second convolutional layer 326 applies third filter 328 to the first convolved set (at the first sampling rate) to generate a filtered data set from which a feature can be extracted. It is to be understood that each convolution block 312, 326, 336 can be either a single convolution layer or a cascade of multiple convolution layers.

The high-resolution detection set 307 is processed along a third convolution path 330. The third convolution path 330 includes the first convolutional layer 312 (operated at a third sampling rate that is four times the first sampling rate), a second convolutional layer 326 (operated at the second sampling rate) and a third convolutional layer 336 (operated at the first sampling rate).

The first convolutional layer 312 samples the high-resolution detection set 307 (at the third sampling rate) using fourth filter 332 to generate a first convolved set. The fourth filter 332 is modified from the second filter 322 by the addition of zero coefficient values between every bin of second filter 322. The first convolved set generated by fourth filter 332 is then processed by the second convolutional layer 326 at the second sampling rate using fifth filter 334 to generate a second convolved set. The fifth filter 334 is modified from the third filter 328 by the addition of zero coefficient values between every bin of third filter 328. The second convolved set is then processed by the third convolutional layer 336 (operated at the first sampling rate) using sixth filter 338 to generate a filtered data set from which a feature can be extracted.

Changing operation from one convolution path to another convolution path based on the range of the object preserves a spatial invariance property of the object over the range and field of view of the three-dimensional sensor 40. The operation words on the natural polar coordinates used by the three-dimensional sensor 40, preventing interpolation losses. The hierarchical nature of the convolution system reduces the number of filters that need to be applied to detections.

It is to be understood that the range 301 can be divided into more than three subranges and additional convolution paths can be built according to the methods described with respect to FIG. 3 in order to filter these additional subranges.

Figure 4:
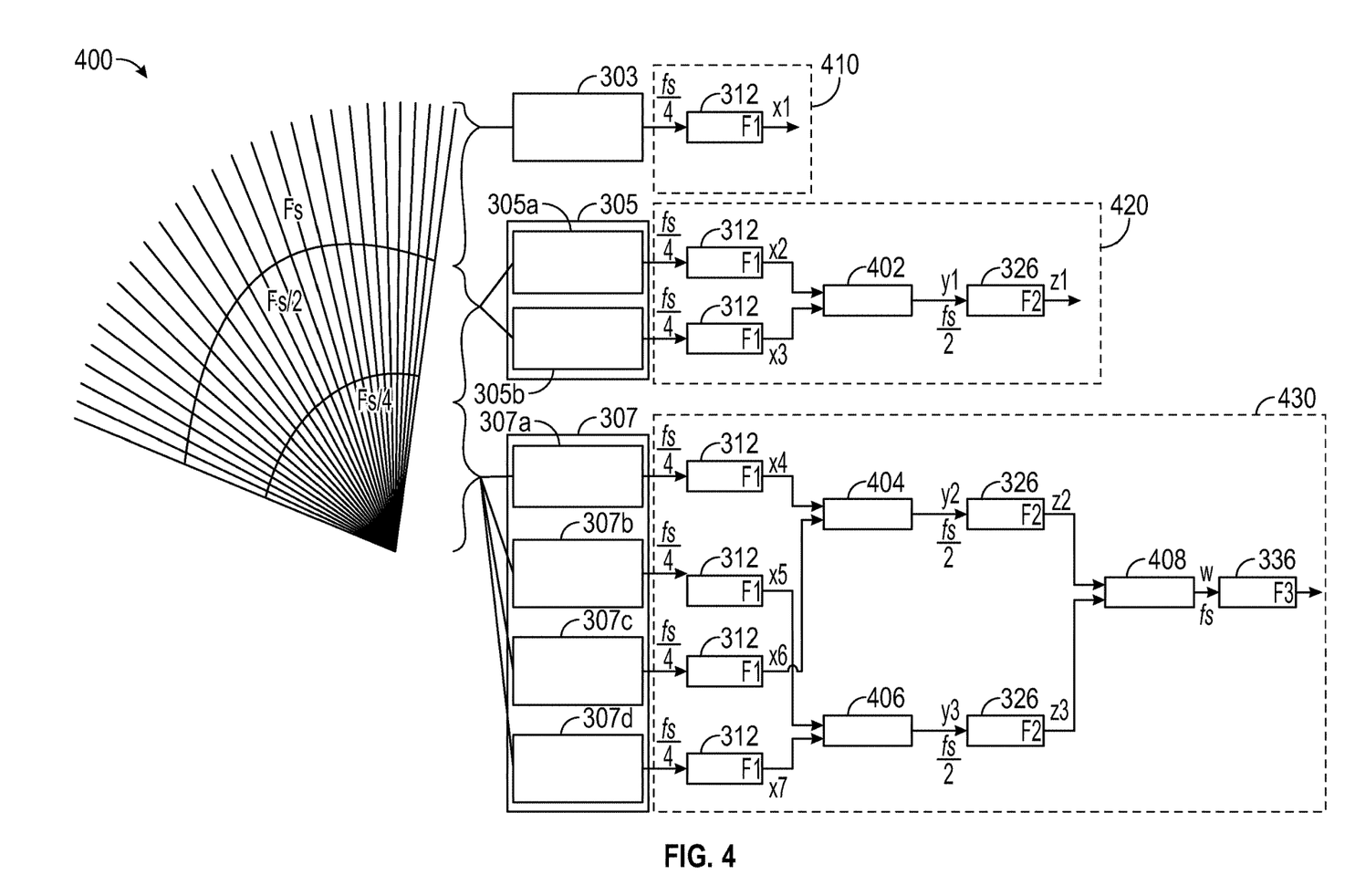
FIG. 4 shows a block diagram illustrating an alternative method of extracting a feature from an object using a range-dependent set of convolutional layers.

FIG. 4 shows a block diagram 400 illustrating an alternative method of extracting a feature from an object using a range-dependent set of convolutional layers. In the alternative method, the number of times a convolutional layer is applied is dependent on range of the object and increases with decreasing range. The sampling range for a convolutional layer remains the same with range. However, the sampling rate of a subsequent convolutional layer increases.

The block diagram 400 shows a first convolution path 410, second convolution path 420 and third convolution path 430. The first convolution path 410 operates on the low-resolution detection set 303, the second convolution path 420 operates on the medium resolution detection set 305 and the third convolution path 430 operates on the high-resolution detection set 307.

The first convolution path 410 includes the first convolutional layer 312 that samples the low-resolution detection set 303 at a first sampling rate (fs/4) resulting in output x1 from which a feature of the object can be extracted.

The second convolution path 420 includes the first convolutional layer 312 and a second convolutional layer 326. The first convolutional layer 312 is applied twice to the medium resolution detection set 305 to obtain two intermediate sets x2 and x3. The intermediate set x2 is based on odd numbered azimuthal bins 305a from the medium resolution detection set 305 while the intermediate set x3 is based on even numbered azimuthal bins 305b from the medium resolution detection set 305.

The intermediate set x2 and intermediate set x3 are then combined together at a combination layer 402 to form a combined data set, y1. Combining the intermediate sets can include summing corresponding pixels of intermediate set x2 and intermediate set x3. Alternatively, combining the output can include averaging the values of corresponding pixels. The second convolutional layer 326 is then applied to the combined data set y1 at the second sampling rate (fs/2) to generate output z1. Features of the object can then be extracted from output z1.

The third convolution path 430 includes the first convolutional layer 312, second convolutional layer 326 and third convolutional layer 336. The first convolutional layer 312 is applied four times to the high-resolution detection set 307 at the first sampling rate. The first application of the first convolutional layer 312 samples a first bin set 307a including every fourth azimuth bin starting at the first azimuth bin. The second application of the first convolutional layer 312 samples a second bin set 307b that includes every fourth azimuth bin starting at the second azimuth bin. The third application of the first convolutional layer 312 samples a third bin set 307c that includes every fourth azimuth bin starting at the third azimuth bin. The fourth application of the first convolutional layer 312 samples a fourth bin set 307d that includes every fourth azimuth bin starting at the fourth azimuth bin.

The first, second, third and fourth applications of the first convolutional layer 312 generates intermediate sets x4, x5, x6 and x7, respectively. Intermediate sets x4 and x6 are combined at a combination layer 404 to generate combined set y2, and intermediate sets x5 and x7 are combined at a combination layer 406 to generate combined set y3. The second convolutional layer 326 is applied to the combined set y2 at the second sampling rate to generate intermediate set z2 and to the combined set y3 at the second sampling rate to generate intermediate set z3. Intermediate sets z2 and z3 are then combined at a combination layer 408 to obtain combined set w. The third convolutional layer 336 is applied to the combined set w at the third sampling rate (fs) to generate a filtered date set from which a feature of the object can be extracted.

Figure 5:
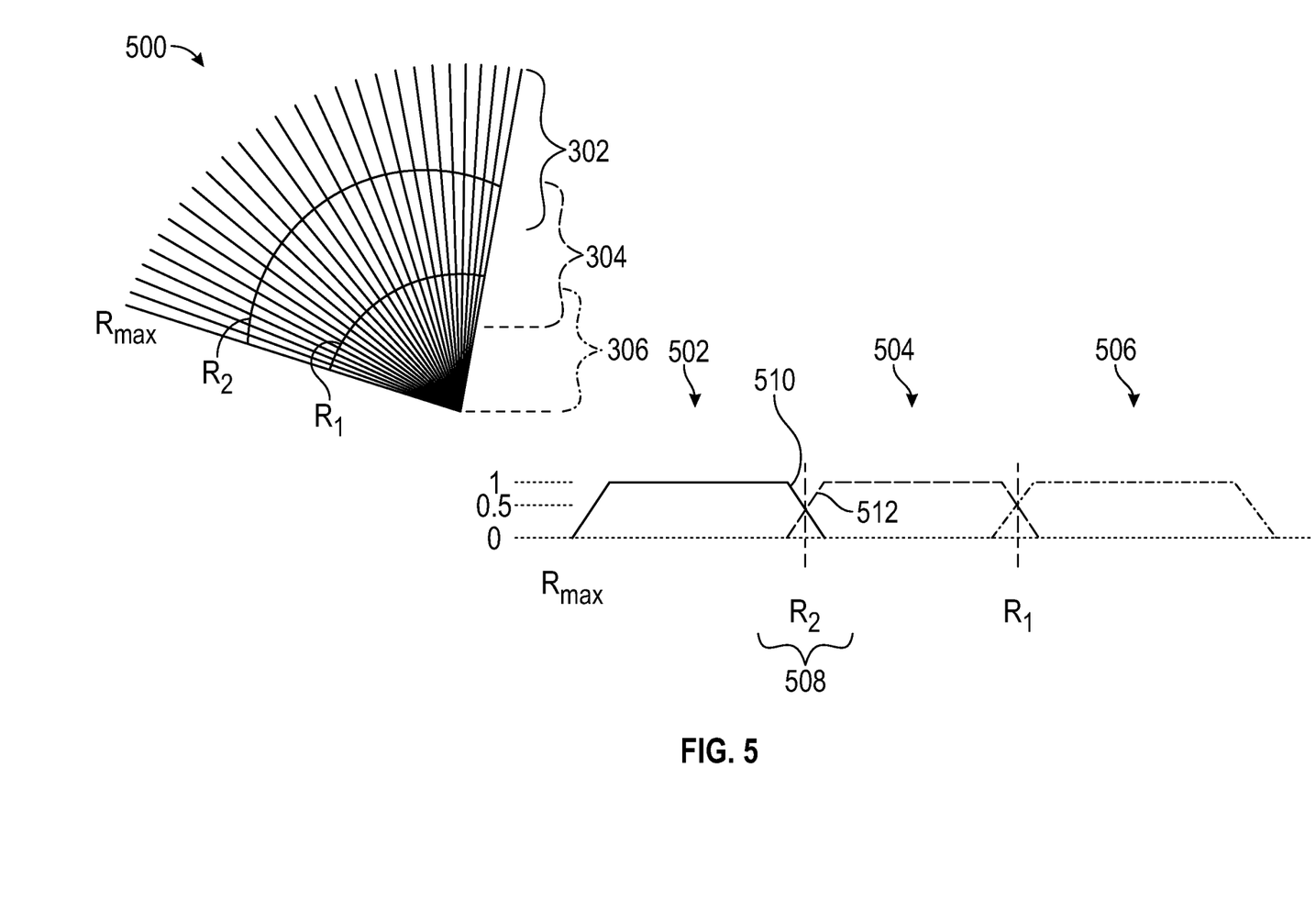
FIG. 5 shows a graph shown a range-dependent weighting for the convolution paths shown in FIGS. 3 and 4.

FIG. 5 shows a graph 500 illustrating a range-dependent weighting for the convolution paths shown in FIGS. 3 and 4. The weighting system includes a first weight 502 that is applied over the first subrange 302, a second weight 504 that is applied over the second subrange 304 and a third weight 506 that is applied over the third range 306. The first weight 502, second weight 504 and third weight 506 are all normalized to be between a maximum value of one and a null value of zero. The weights indicate an extent to which a convolution path is applied to a detection set in order to produce the output. The weight for a selected subrange is at maximum value over a substantially entire radial extend of the subrange and tapers off linearly with radial distance at the ends of the subrange. As the object crosses from one subrange to an adjacent subrange, a weight for one convolution path can be decreased linearly while the weight for the adjacent subrange can be increased. For example, in a region 508 at or near the radial boundary R2 between the first subrange 302 and the second subrange 304, the first weight 502 decreases linearly from the maximum value to the null value as the object leaves the first subrange 302, as shown by line 510. Also. in region 508, the second weight 504 increases linearly from the null value to the maximum value as the object enters the second subrange 304, as shown by line 512. The sum of the first weight 502 and the second weight 504 is equal to one in region 508.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
obtaining a detection set related to an object at a range from the vehicle;
selecting a convolution path for the detection set based on the range of the object, wherein the convolution path includes one or more convolutional layers and a number of the one or more convolutional layers is dependent on the range of the object;
applying the one or more convolutional layers of the selected convolution path to the detection set to generate a filtered data set; and
operating the vehicle with respect to the object using the filtered data set.

2. The method of claim 1, wherein the one or more convolutional layers includes a first convolutional layer and a sampling rate of the first convolutional layer that increases as the range decreases.

3. The method of claim 1, wherein the one or more convolutional layers includes a first convolutional layer, further comprising defining a first subrange with respect to the vehicle and a second subrange with respect to the vehicle that is less than the first subrange, applying the first convolutional layer at a first sampling rate when the object is in the first subrange and applying the first convolutional layer at a second sampling rate when the object is in the second subrange, wherein the second sampling rate is twice the first sampling rate.

4. The method of claim 3, further comprising applying a second convolutional layer at the first sampling rate to an intermediate set generated at the first convolutional layer when the object is in the second subrange.

5. The method of claim 3, further comprising defining a third subrange with respect to the vehicle that is less than the second subrange, applying the first convolutional layer at a third sampling rate when the object is in the third subrange, wherein the third sampling rate is twice the second sampling rate, applying a second convolutional layer at the second sampling rate to an intermediate set generated at the first convolutional layer, and applying a third convolutional layer to an output of the second convolutional layer at the first sampling rate.

6. The method of claim 1, wherein the one or more convolutional layers includes a first convolutional layer, further comprising defining a first subrange with respect to the vehicle and a second subrange with respect to the vehicle that is less than the first subrange, and one of applying the first convolutional layer to the detection set once in the first subrange and applying the first convolutional layer twice in the second subrange, wherein a sampling rate of the first convolutional layer is the same within the first subrange and the second subrange.

7. The method of claim 1, further comprising defining a first subrange and a second subrange, defining a first weight over the first subrange and a second weight over the second subrange for selecting the convolution path, wherein the first weight and the second weight taper linearly with radial distance at a radial boundary between the first subrange and the second subrange with a sum of the first weight and the second weight equal to one.

8. A system for operating a vehicle, comprising:
a sensor for obtaining a detection set related to an object at a range from the vehicle; and
a processor configured to:
select a convolution path for the detection set based on the range of the object, wherein the convolution path includes one or more convolutional layers and a number of the one or more convolutional layers is dependent on the range of the object,
apply the one or more convolutional layers of the selected convolution path to the detection set to generate a filtered data set, and
operate the vehicle with respect to the object using the filtered data set.

9. The system of claim 8, wherein the one or more convolutional layers includes a first convolutional layer and a sampling rate of the first convolutional layer that increases as the range decreases.

10. The system of claim 8, wherein the one or more convolutional layers includes a first convolutional layer, the processor further configured to define a first subrange with respect to the vehicle and a second subrange with respect to the vehicle that is less than the first subrange, apply the first convolutional layer at a first sampling rate when the object is in the first subrange and apply the first convolutional layer at a second sampling rate when the object is in the second subrange, wherein the second sampling rate is twice the first sampling rate.

11. The system of claim 10, wherein the processor is further configured to apply a second convolutional layer at the first sampling rate to an intermediate set generated at the first convolutional layer when the object is in the second subrange.

12. The system of claim 10, wherein the processor is further configured to define a third subrange with respect to the vehicle that is less than the second subrange, apply the first convolutional layer at a third sampling rate when the object is in the third subrange, wherein the third sampling rate is twice the second sampling rate, apply a second convolutional layer at the second sampling rate to an intermediate set generated at the first convolutional layer, and apply a third convolutional layer to an output of the second convolutional layer at the first sampling rate.

13. The system of claim 8, wherein the one or more convolutional layers includes a first convolutional layer, and the processor is further configured to define a first subrange with respect to the vehicle and a second subrange with respect to the vehicle that is less than the first subrange, and perform one of applying the first convolutional layer to the detection set once in the first subrange and applying the first convolutional layer twice in the second subrange, wherein a sampling rate of the first convolutional layer is the same within the first subrange and the second subrange.

14. The system of claim 8, wherein the processor is further configured to define a first subrange and a second subrange and define a first weight over the first subrange and a second weight over the second subrange for selecting the convolution path, wherein the first weight and the second weight taper linearly with radial distance at a radial boundary between the first subrange and the second subrange with a sum of the first weight and the second weight equal to one.

15. A vehicle, comprising:
a sensor for obtaining a detection set related to an object at a range from the vehicle; and
a processor configured to:
select a convolution path for the detection set based on the range of the object, wherein the convolution path includes one or more convolutional layers and a number of the one or more convolutional layers is dependent on the range of the object,
apply the one or more convolutional layers of the selected convolution path to the detection set to generate a filtered data set, and
operate the vehicle with respect to the object using the filtered data set.

16. The vehicle of claim 15, wherein the one or more convolutional layers includes a first convolutional layer and a sampling rate of the first convolutional layer that increases as the range decreases.

17. The vehicle of claim 15, wherein the one or more convolutional layers includes a first convolutional layer, the processor further configured to define a first subrange with respect to the vehicle and a second subrange with respect to the vehicle that is less than the first subrange, apply the first convolutional layer at a first sampling rate when the object is in the first subrange and apply the first convolutional layer at a second sampling rate when the object is in the second subrange, wherein the second sampling rate is twice the first sampling rate.

18. The vehicle of claim 17, wherein the processor is further configured to apply a second convolutional layer at the first sampling rate to an intermediate set generated at the first convolutional layer when the object is in the second subrange.

19. The vehicle of claim 15, wherein the one or more convolutional layers includes a first convolutional layer, and the processor is further configured to define a first subrange with respect to the vehicle and a second subrange with respect to the vehicle that is less than the first subrange, and perform one of applying the first convolutional layer to the detection set once in the first subrange and applying the first convolutional layer twice in the second subrange, wherein a sampling rate of the first convolutional layer is the same within the first subrange and the second subrange.

20. The vehicle of claim 15, wherein the processor is further configured to define a first subrange and a second subrange and define a first weight over the first subrange and a second weight over the second subrange for selecting the convolution path, wherein the first weight and the second weight taper linearly with radial distance at a radial boundary between the first subrange and the second subrange with a sum of the first weight and the second weight equal to one.

* * * * *